United States Patent [19]

Comerford et al.

[11] Patent Number: 4,577,289
[45] Date of Patent: Mar. 18, 1986

[54] HARDWARE KEY-ON-DISK SYSTEM FOR COPY-PROTECTING MAGNETIC STORAGE MEDIA

[75] Inventors: Liam D. Comerford, Carmel; Steve R. White, Mt. Kisco, both of N.Y.

[73] Assignee: International Business Machines Corporation, Armonk, N.Y.

[21] Appl. No.: 567,294

[22] Filed: Dec. 30, 1983

[51] Int. Cl.[4] ............................................. G06F 12/14
[52] U.S. Cl. ...................................... 364/900; 360/60
[58] Field of Search ... 364/200 MS File, 900 MS File; 360/60

[56] References Cited

U.S. PATENT DOCUMENTS

3,699,528 10/1972 Carlson et al. ..................... 364/200

*Primary Examiner*—Raulfe B. Zache
*Attorney, Agent, or Firm*—Jack M. Arnold

[57] ABSTRACT

A copy-protection scheme is implemented for software which may be stored on a magnetic storage medium such as a disk. The medium is comprised of sections which are divided into subsections, with an original having indicia on at least one subsection of at least one section that is not modifiable by the medium write process, with a copy having no such indicia, or having indicia in a different pattern. A product program may be stored on the medium, and is executable only if the particular medium is an original. A medium test program may also be stored on the particular medium, and is used to test if the medium is an original or a copy. The test program writes the sections with a test pattern which generates a change in the pattern of magnetic domains of the medium, a subsection at a time, with a subsection responding to the test pattern only in the absence of indicia thereon, to form a stored pattern on the given section. An expected pattern and the stored pattern are compared at least a subsection at a time to determine if corresponding subsections have a predetermined pattern of magnetic domains. The product program is executed only in response to the comparison determining that corresponding subsections have predetermined patterns of magnetic domains which is indicative of the presence of said indicia, and the particular medium being an original.

63 Claims, 7 Drawing Figures

HARDWARE KEY-ON-DISK SYSTEM FOR COPY-PROTECTING MAGNETIC STORAGE MEDIA

DESCRIPTION

1. Technical Field

The invention is in the field of data processing, and specifically is directed to a software copy-protection mechanism. In particular, a hardware-key-on-disk copy-protection method is provided which can be used on existing computer systems with no additional hardware, and which is transparent to the software user.

2. Background Art

Copy-protection mechanisms are utilized to inhibit software piracy, which is the creation of unauthorized copies of commercial software. As the market for personal computers, home computers, workstations and intelligent products grows, piracy increasingly becomes a problem. The purpose of a copy-protection mechanism is to deter piracy by making copying of software as difficult as possible. Two basic classes of copy-protection mechanisms have evolved to deter piracy, namely, software-based and hardware-key.

Software-based methods encode information on a disk so that conventional copying facilities available in most operating systems cannot accurately copy the information to another disk. The program on the disk checks for this encoded information, and fails to function unless it is there. Copying facilities are now commercially available which can successfully copy most disks protected in this manner.

Hardware-key methods rely on the existence of information known as the "key", available to the program, but resident in the system hardware rather than on changeable magnetic media like the disk. The program checks for the "key" information, and fails to function if the key is not found. Hardware duplication facilities are not commonly found in personal computers, while disk duplication facilities are. This makes hardware keys more costly to duplicate than software, so these methods can be more effective than software-based methods in deterring piracy.

One proposed hardware-key method requires that the computer manufacturer install a hardware serial number in each machine as the hardware key. This method requires every piece of software to be customized to a particular machine. This limits the availability and the interchangeability of software. A second method, currently in use, requires the software user to buy a special piece of hardware with each software product. This piece of hardware provides the key, and has to be attached to the machine whenever the corresponding software is run, which makes the method unattractive.

According to the present invention, a copy protection scheme utilizing the best features of both software based and hardware key methods is disclosed. A hardware key is encoded directly onto a magnetic medium such as a floppy disk. This key consists of indicia in at least one subsection of a section of the disk that are not modifiable by the conventional medium write process. The data read from a section containing indicia differs in a predictable way from the data written to that section. It follows that a key can be stored in the form of indicia. The disk can be authenticated by comparing the result of a read-following-write with the expected results of such an operation (in the presence of the key pattern of indicia). Software can be made to function only in the presence of this key as the presence of the key indicates that the original medium is present.

This method provides the security associated with previous hardware key methods, but involves no modifications to existing computing systems, and requires no additional hardware purchases by the user. Further, the copy protection mechanism is transparent to the user.

DISCLOSURE OF THE INVENTION

A method and apparatus are disclosed for determining if a particular magnetic medium comprised of sections which are divided into subsections is an original or a copy, with an original having indicia on at least one subsection of a given section thereon which are not modifiable by the medium write process, and a copy not having said indicia, or not having this same pattern of indicia. A product program is provided, which is executable only if the medium is an original. A medium test program is also stored on the particular medium to test if the original medium is present. The given section of the particular medium is written with a test pattern which generates a change in the pattern of magnetic domains in the medium in at least one of the subsections with a subsection in said given section responding to the test pattern only in the absence of indicia thereon, to form a stored pattern in the given section. An expected pattern and the stored pattern are compared on at least a per subsection basis to determine if the expected pattern and the stored pattern correspond. The product program is executed only in response to the comparison determining that these subsections have predetermined patterns of magnetic domains, which is indicative of the presence of said indicia, and the particular medium being an original.

BEST MODE OF CARRYING OUT THE INVENTION

A key-on-disk copy-protection method is described in which a hardware key is formed on a magnetic medium to differentiate an original medium from a copy. Indicia are created on the medium that are not modifiable by the medium write process, and are used as the hardware key. The indicia may be nonmagnetic, or permanently magnetized. Here, and for the remainder of this document, permanently magnetized will be taken to mean having a coercivity so large that the magnetic fields used to write conventional media are insufficient to alter the magnetization of these indicia. The indicia modify, in a predictable way, data written on the medium, such that data read from a sector differs from the data written to the sector in a predictable way.

There are several methods of encoding information onto magnetic media. Each of them relies on the ability of the read head to detect the pattern of magnetic domains in the areas passing under the head. One such method uses a change in the orientation of magnetic domains to represent a binary ONE, while no change in orientation represents a binary ZERO.

An essential feature of the key-on-disk method is to change the magnetic properties of certain select areas or locations on the medium such that they no longer respond to the write head by changing their magnetic orientation. For the purpose of writing information to the medium, these areas are essentially nonmagnetic or permanently magnetized, that is, nonmagnetic or permanently magnetized indicia are formed on the medium at these select areas or locations.

Once these nonmagnetic or permanently magnetized areas are introduced onto the medium, they represent information that is not modifiable by the medium write process. Many encoding schemes involve read operations which only detect transitions between two opposite states of magnetization. That is, they are not sensitive to transitions from a magnetized area to a nonmagnetized area. Two such encoding schemes that function this way are Modified Modified Frequency Modulation (MMFM) and Non-Return to Zero Inverted (NRZI). MMFM is the encoding scheme used in the IBM Personal Computer, and is described in the IBM Personal Computer Technical Reference Manual, 1981, at pp. 2-89. NRZI is an encoding scheme set forth in "Computer Storage Systems and Technology," John Wiley and Sons, Inc., 1977, pp. 372. If nonmagnetic or permanently magnetized areas can be introduced into the medium that are reliably somewhat smaller than the size of one bit, the key-on-disk method is operable with any of these encoding schemes. A method of making such areas larger than one-half bit in size will be described subsequently.

It can be determined if the indicia exist in a specified pattern in a medium section or sector by the following method. First, the entire sector is written with a pattern which will generate a change in magnetic orientation in a predetermined pattern, for example, at every possible bit location. Next, the sector is read into a buffer, and if the buffer contains the pattern that was written, the sector contained no indicia, and is therefore, a copy. If, however, the pattern differs in a way which is exactly what is expected from the indicia, it can be concluded that this medium has the proper key-on-disk formed thereon and the medium is an original. The pattern of indicia can be made essentially unique to each medium.

In the copy-protection method and apparatus according to the invention, the software that must be provided consists of two parts: a test program, which if the key is valid gets and starts the product program, and the product program itself. The test program may also be incorporated into the product program, and utilized for periodic or a one time verification of authenticity.

The product program and the test program must be stored in such a form that the product program or some fraction thereof cannot be executed by conventional means. The test program contains knowledge of the correct key, and the means of executing the product program. If the key which appears on a medium is known in advance, a copy of the test program and the product program can be prepared which can be copied directly onto that key carrying medium.

It may be less expensive in some applications to provide a random collection of media to the machinery which puts the test program and product program on them. In this instance, the copying program must first read the key from a medium, modify the test program to incorporate this key, and then write the test program and the product program onto the medium. Each of these processes can be implemented with existing equipment, which minimizes the cost of their implementation.

Figure 1:
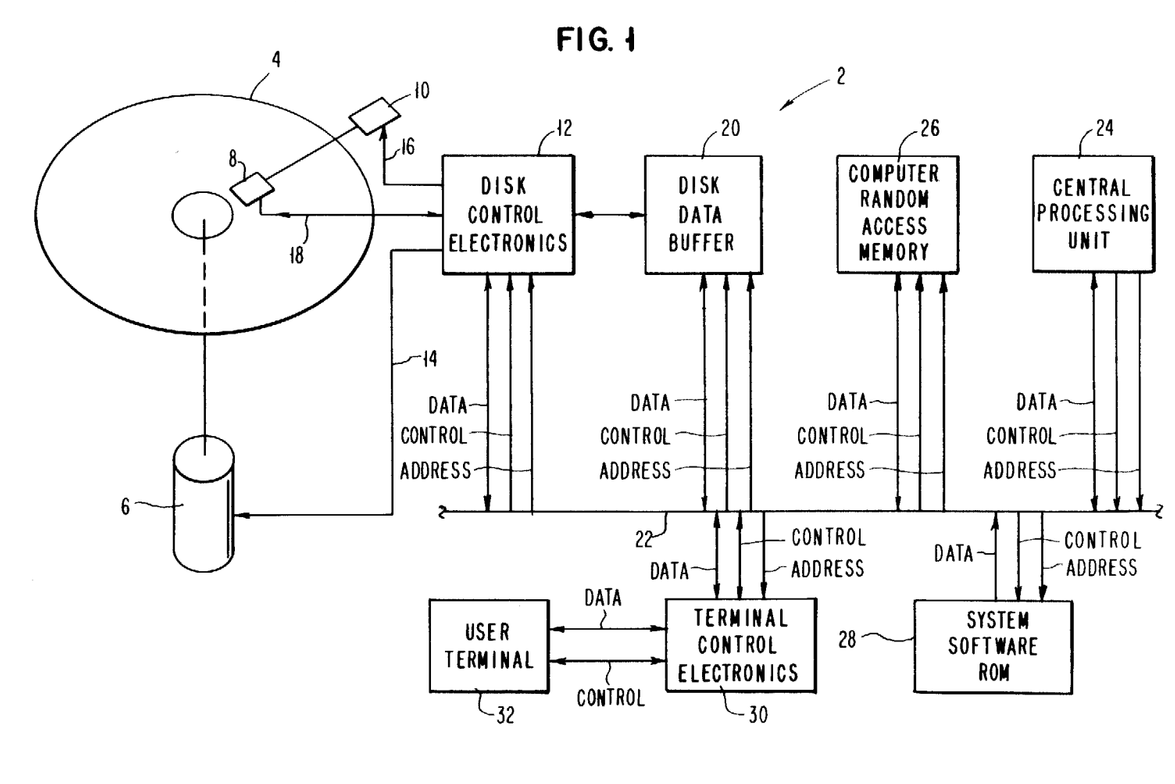
FIG. 1 is a block diagram of a computer system which includes a key-on-disk copy-protection system.

Refer now to FIG. 1 which is a block diagram of a computer system 2, which may be an IBM personal computer system, which tests if a particular medium 4, in this instance a disk, has the key-on-disk hardware key formed thereon. That is, the system determines whether or not the disk 4 is an original or a copy. Disk is used in a generic sense to mean a hard disk or a floppy disk. A disk drive motor 6 drives the disk 4, and a read/write head 8 is positioned over particular tracks under control of a positioning apparatus 10. A disk control electronic circuit 12 provides control signals to the drive motor 6 and the head positioning apparatus 10 via lines 14 and 16 respectively, and sends and receives data to and from the read/write head 8 via a line 18. A data buffer 20 exchanges read and written information with control network 12, via line 19, and the central processing unit 24 via system bus 22. Also connected to the bus 22 are the CPU 24, the random access memory 26, the system software ROM 28, and the terminal control electronics 30. The user terminal 32 is connected to the terminal control electronics 30.

Figure 2:
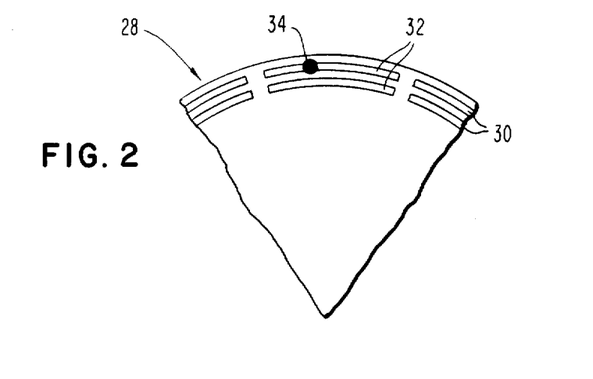
FIG. 2 is a section of a magnetic disk, comprised of tracks which are divided into sectors and a plurality of binary bit positions per sector, with indicia, which form a hardware key, being formed on at least one bit position of at least one sector of at least one track.

FIG. 2 is a section of a magnetic medium, in this instance a disk, with indicia formed thereon. A disk 28 includes a plurality of tracks 30, with a plurality of sectors 32 formed thereon with a plurality of bit storage locations in each sector, and including at least one indicium 34. As was stated earlier, the indicia form the hardware key on the disk, and the indicia may be formed on one or more bit storage locations in one or more sectors and in one or more tracks. That is, the indicia may be as small as one bit storage location, as large as one or more sectors, or as large as one or more tracks.

Figure 3:
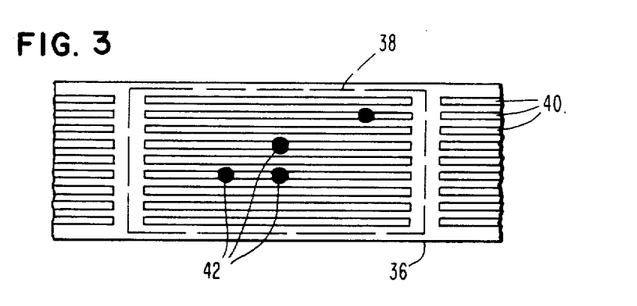
FIG. 3 is a section of a magnetic tape including the copy-protection scheme of the present invention, with a hardware key formed of a plurality of indicia on at least one bit position of at least one track of at least one record.

FIG. 3 is a section of another magnetic medium operable in the present invention, in this instance a 9-track tape, with the tape 36 being comprised of a plurality of records 38 comprised of tracks 40 with a plurality of indicia 42 formed thereon.

Figure 4:
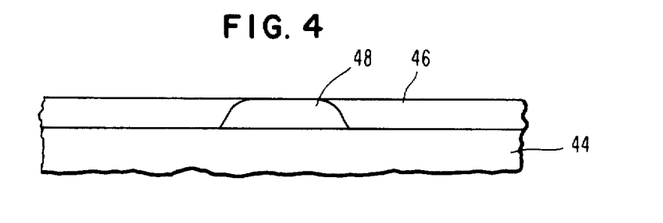
FIG. 4 is a cross-section of a magnetic medium, including an indicium which forms a hardware key on the medium.

Refer to FIG. 4 which shows a cross-section of a magnetic medium, including an indicium. The medium is formed of a nonmagnetic substrate 44 having a magnetic coating 46 on the surface, with an indicium 48 formed in the coating 46. How the indicium is formed on a magnetic medium during manufacture or after manufacture is set forth below.

Nonmagnetic indicia are produced during manufacture on different types of media by essentially similar processes. For example, all media manufacturing involves the coating of a substrate with a carrier of magnetizable particles. The carrier is a liquid at the start of the process and is called the "ink". In the case of floppy disks and tapes, the ink is filtered to assure particle size uniformity and is sprayed, wiped, rollered or otherwise coated onto a "substrate" generally made of the plastic Mylar. (Mylar is a trademark of the DuPont Corporation.) The coated substrate is passed between hot and cold rollers to dry and level the ink and to fix the coating thickness. The completed medium is cut into disk or ribbon form and packaged to make floppy disks or tapes. In the case of hard disks, the ink is spun onto a substrate called a "platter", generally aluminum, in the presence of a magnetic field to obtain a dry, level, uniform, magnetically-oriented coating. In each case, if the substrate or platter were premarked with a formulation of the ink which contained no magnetizable particles, or which contained magnetizable particles of higher coercivity than can be affected by conventional write heads, then the ink in the premarked regions would displace the normal ink in those regions when normal manufacturing proceeded. On completion of the manufacturing process, the premarked regions would constitute nonmagnetic, or permanently magnetized, indicia.

In the case of hard disks, magnetizeability depends upon the correct orientation of elongated magnetizable particles in the ink. The following methods are capable of producing an arbitrary pattern of nonmagnetic indicia on the disk. Nonmagnetic indicia may be introduced during manufacturing by changing the alignment with which the magnetic particles are fixed in place. This may be accomplished in at least three ways. According to the first way, the particles in the nonmagnetic indicia can be misaligned, radially for instance, by introducing a magnetic field which is local to these indicia during this inking process. The field must be strong enough to cancel the ambient circumferential field locally, and to force the particles to be misaligned within the indicia. These misaligned particles will have a small magnetizability in the usual direction, and will appear essentially nonmagnetic to the write/read process. This misaligning magnetic field can be produced in either of two ways. (1) Use a co-rotating magnetic device that produces a field only in fixed areas on the disk. (2) Dot the reverse side, that is the bottom, of the disk with a magnetic material that is magnetized to create a local field on the top side that has the proper direction and magnitude. Lay down the ink in the usual way. Afterwards remove the dots from the reverse side.

A second way to create nonmagnetic indicia during manufacture is to create a raised pattern on the substrate before it is coated. During the inking process, the ink will avoid the raised areas, which will then remain nonmagnetic. In the case of hard disks, ink must flow around these raised areas, so it may be best to restrict the pattern of indicia to lie along a radius of the disk. These raised regions can be created in two ways. (1) Use a photolithographic technique. Coat the substrate or platter with the photosensitive material, and use a mask to expose the material optically. Then wash away all of the exposed photosensitive material. Next, coat the substrate with ink as usual. When the ink has set, remove the remaining photoresist, and, if desired, backfill the resulting holes with nonmagnetic, or permanently magnetizable, material. (2) In the case of plastic substrates, stamp and heat the substrate with a die which contains the desired pattern of raised spots, then coat the substrate with ink as usual.

A third way of creating nonmagnetic indicia during manufacture is to coat the desired areas of the substrate with a material to which the ink will not adhere, then accomplish the inking process as usual. The nonmagnetic indicia then appear as holes in the magnetic coating. Again, because of the flow properties of the ink, in the case of hard disks, it may be best to restrict the bit pattern to lie along a radius of the disk.

Disks that have already been manufactured may have a key-on-disk feature incorporated onto them. This may be performed by the disk manufacturer, by the software distributor, or by a third-party original equipment manufacturer. There are several ways of accomplishing this, of which three will be detailed. The first way is to remove the magnetic material from the area where indicia are to be formed. This can be done in at least three ways. The first is to thermally ablate or photodecompose the magnetic material with, for instance, a laser. This has the advantage that it is fast, and reproducible. Furthermore, the pattern of indicia can be changed easily from one disk to the next by programming the laser pulses appropriately. In a mass-production environment, an effective arrangement would be to spin the disk in front of a laser. The laser would then ablate the desired pattern circumferentially along one or more disk tracks. The process of writing the pattern onto the disk in a known position would take fewer than two rotations of the disk. If necessary, surface irregularities can be removed by polishing after the ablation process is complete. The second way to remove the magnetic material is abrasively, by mechanical means, in the desired pattern. The third way to remove the magnetic material is to heat the disk material dielectrically, for example, to melt it in the right spots, and remove the magnetic material by magnetic migration, or mechanical means.

A second way of creating nonmagnetic indicia on already manufactured disks is to emboss the finished disk surface with a mechanical die. This depresses the magnetic material away from the read head far enough that it is not detected as magnetic. Because this will deform both disk surfaces, it can be only used on single-sided floppy disks.

A third way of creating nonmagnetic indicia on already manufactured hard disks is to soften the solidified coatings with heat or solvent, in those areas where it is desired to have indicia. Then, a magnetic field is induced which realigns the magnetic particles, and the coating is allowed to reset. This has the same effect as inducing a misaligning magnetic field during manufacture, but can be accomplished afterwards.

The indicia previously described as being on the order of a half bit in size, can be made half a bit or larger in size by the method set forth below. The indicia are made larger in size to make their alignment noncritical in this method, thereby increasing the reliability and ease of manufacture. These indicia can be produced in any of the ways described above. The following describes three additional ways that such indicia can be produced.

First, remove magnetic material from the data field of a sector. This data field may then be filled with nonmagnetic or permanently magnetized material. This is a direct generalization of the key-on-disk method. The standard format for organizing information on a floppy disk divides the data into fixed-length increments, called data fields, separated by addressing information, sector headers, data checks, etc. The data fields always occur in approximately the same physical location on the disk.

Before the disk is formatted, and the software written onto it, produce indicia in the area which will be occupied by one or more of the data fields. The indicia should be short enough circumferentially to insure that they will always be completely contained in the data field, and can be as long as the manufacturer requires.

When this sector is examined by the key-on-disk method, this data field will be found to produce errors reproducibly. Depending upon the size and location of the indicia, these may be failures in a single bit of information, failure in the check sum, or a change in the detected length of the sector. In any of these cases, the original disk is distinguished from a copy by the presence of a predictable pattern of indicia on the disk.

Second, produce the indicia in the sector header, as the sector header provides information to the disk controller about which sector follows it. If indicia in a sector header corrupt this information, the disk controller can recognize that there is an error in the sector. Again, the presence of this error constitutes a predictable pattern on the original disk which can be used to verify its authenticity in a key-on-disk copy-protection method.

Third, produce indicia over one or more entire disk tracks. The spacing between tracks on a disk is substantially greater than the circumferential bit spacing. Using a whole track as an indicium creates a key-on-disk implementation which may be higher in reliability and lower in manufacturing cost than any of the previous methods.

A typical disk format contains 40 tracks on a single side, with 2 tracks used for system information. If, say, 3 tracks of the remaining 38 are used for indicia, there are $38 \times 37 \times 36 = 50,616$ unique keys that may be generated. This is a sufficiently large number for identification purposes, and reduces the space available for the software product on the disk by less than 8%.

Figure 5:
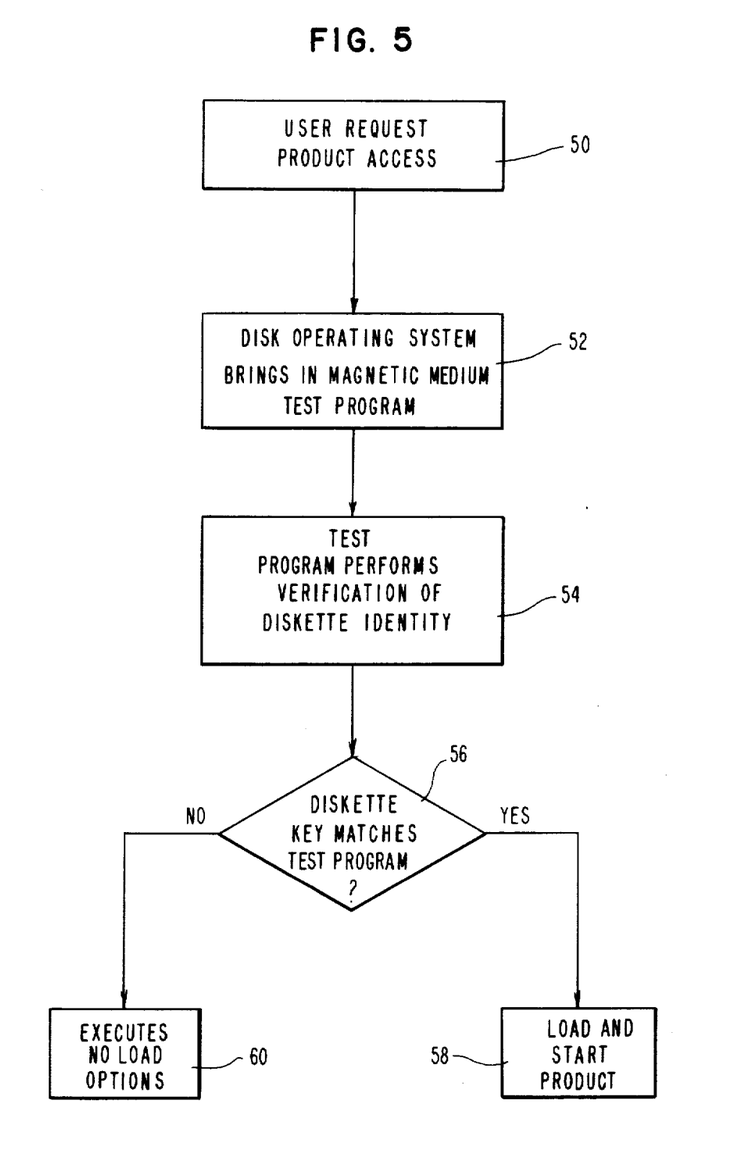
FIG. 5 is a general flow chart of a disk utilization process according to the present invention.

FIG. 5 is a flow chart of the disk utilization process, to test if a particular disk is an original or a copy. As indicated at 50, a user requests that the product program be run, and the disk operating system brings in the test program, as indicated at 52. The test program then performs the verification of the disk's identity, that is, whether it is an original or a copy as indicated at 54. At 56, one branch is selected on the basis of the outcome of the verification 54. If the disk is an original, as indicated at test 54, the product is loaded and started in the system as indicated at 58. On the other hand, if the disk is a copy, the system executes a no load option, such as halting the CPU, as indicated at 60, and the program product is not executed.

As stated earlier, the indicia created on the magnetic medium form the hardware key which is utilized to test whether a particular medium is an original or a copy. These indicia modify data written on the medium in a predictable way, such that the data read from a sector differs in a predictable way from the data written to the sector. That is, if the medium is an original the data written to and read from the medium differ in the predicted way due to the indicia, but if the medium is a copy, the data written and the data read are either identical, or differ in other than the predicted way.

Figure 6:
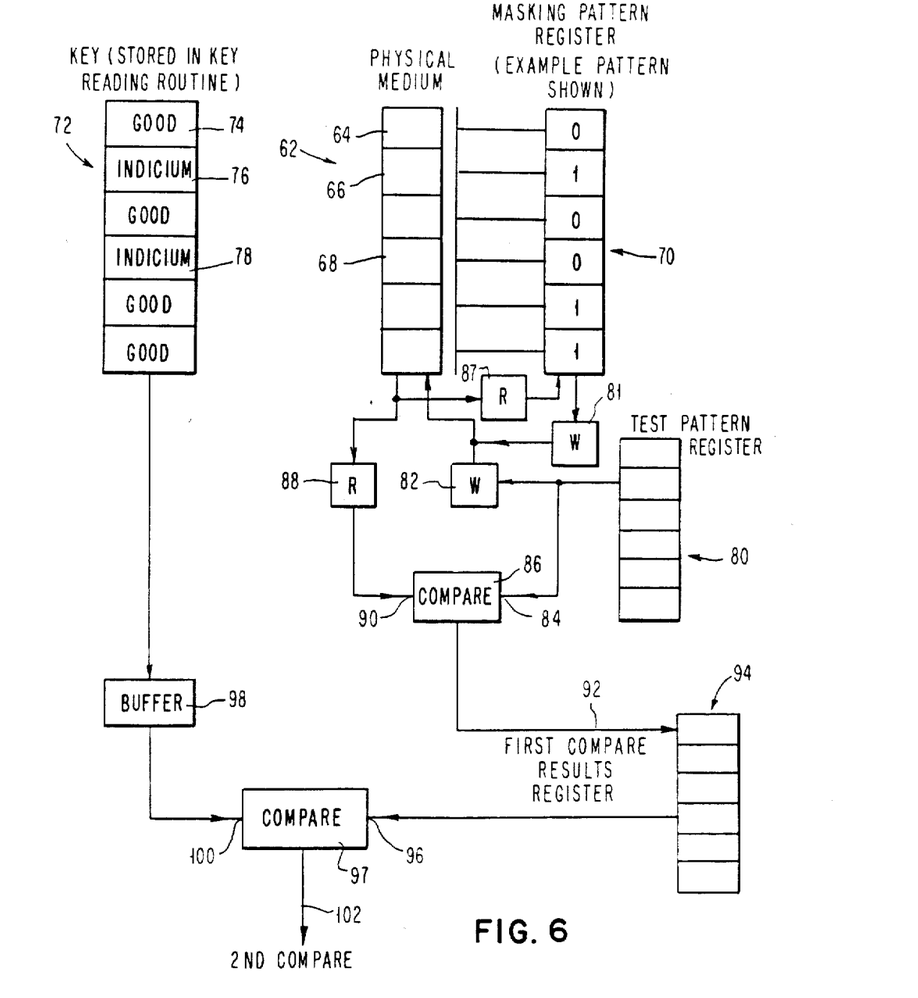
FIG. 6 is a block diagram representation of a magnetic medium test program for determining if a magnetic medium is an original or a copy.
Figure 7:
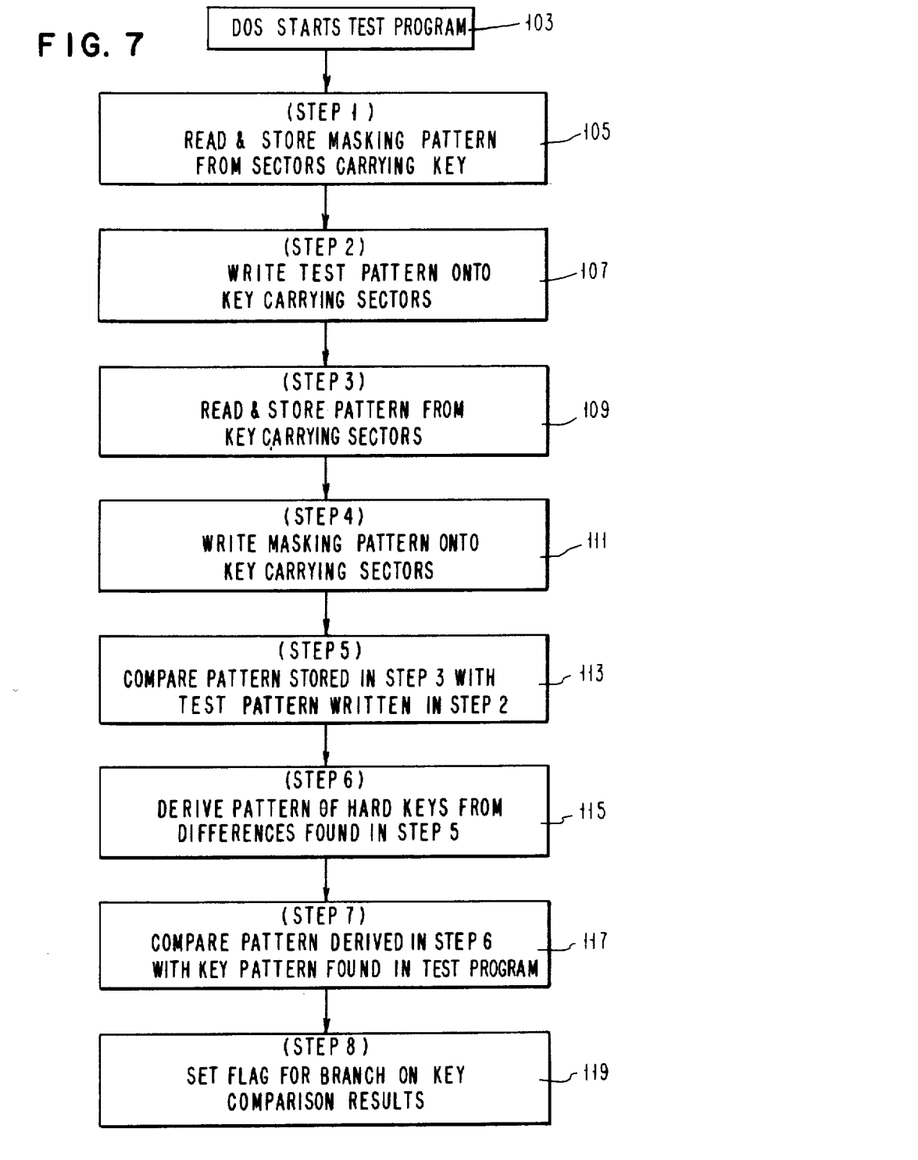
FIG. 7 is a detailed flow chart of the test program illustrated in the flow chart of FIG. 5.

The test program flow chart of FIG. 7 shows the test program set forth at 54 of FIG. 5, which performs the test of the identity of the disk. Prior to describing FIG. 7, FIG. 6 will be described, which is a block diagram representation of hardware which could implement the program for testing whether a disk is an original or a copy. It is to be appreciated that this hardware does not exist in the described computing system, but it is set forth only as a teaching example to make the invention more clear. FIG. 7 illustrates a test program flow chart which actually practices the invention. A portion of a physical medium 62 is illustrated which includes a plurality of binary bit, or word, or larger data storage positions 64 and includes indicia, as indicated at 66 and 68. As previously described, a key-on-disk is a hardware key such as the indicia 66 and 68. The following describes how the medium 62 is tested to determine whether it is an original or a copy.

A masking pattern register 70 stores a binary pattern which is found in the positions 64 of the medium 62. A key storage register 72 contains a binary representation of the section or sector of the physical medium which contains the key, with a binary code being generated to represent whether there is good, that is changeable, magnetic material at certain positions 74 on the disk, or indicia as indicated at 76 and 78. It is seen that the indicia representation 76 and 78 in register 72 corresponds to the positions where the indicia 66 and 68 are on the physical medium 62. A test pattern register 80 contains a test pattern which is written on the physical medium 62, and subsequently read out and compared to test whether the physical medium 62 is an original or a copy.

The masking pattern initially stored on the physical medium 62 is read therefrom through a read buffer 87 and stored in the masking pattern register 70 prior to the validation process. A test pattern is then read from the register 80 through a write buffer 82 onto the physical medium 62. The physcial medium 62 is then read out through a read buffer 88 and thence to input 90 of the positionwise comparator 86. The test pattern is synchronously applied to the other input 84 of the positionwise comparator 86. If there is a failure to match at comparator 86, a first compare signal is generated on a line 92, which is indicative of the physical medium 62 containing indicia at locations whose relative positions are stored in register 94. This failure-to-match signal could be used to signal the system to run the product program in a minimally secure version of the system. However, it is to be appreciated that this in fact could be a copy which just happens to have indicia at a tested spot on the medium. A further comparison may be generated, as set forth below, to test whether or not the indicia are contained in the proper locations on the disk. Register 94 provides a signal output which is indicative of the sequence of good areas and indicia on the medium 62 to a first input of a comparator 96. The key pattern register 72 is synchronously read out to provide a signal representation of the actual key pattern of good areas and indicia formed on the medium 62, and is provided to a second input 100 of the comparator 97. If there is a match, a signal is provided on the output 102 which is indicative of the physical medium being an original, and the product program may then be run. On the other hand, if a match is not found by the comparator 97, this is indicative that the physical medium 62 is a copy even though it may carry some indicia.

At the completion of the validation process, the masking pattern stored in register 70 may be restored to the physical medium 62 through a write buffer 81 in order to obscure the verification process.

FIG. 7 is a flow chart of a minimal test program which can be used to verify the identity of media which have been marked according to this method.

When the medium is to be tested, the program calling for verification of the disk identity starts the test program. In this example the program calling, at 103, for this verification is the Disk Operating System (DOS). The test program will read and store, 105, the pattern of bits stored in a sector of the disk. This pattern is called the masking pattern. This sector may be identified to the program either by internally stored data or by an appropriately named file on the disk. A pattern of bits is then written, 107, onto the same sector. This pattern is stored in the test program and is selected for the property of requiring changes in the orientation of magnetic domains on the disk at locations which contain indicia. The contents of this sector are then read back 109 and stored in the computer memory. It should be noted that if there are no indicia present, the pattern read back in this step will be identical to the pattern which was written in the preceding step, while if the indicia are present, the medium will be incapable of faithfully recording the pattern, so on reading, it will have been changed. The test program then writes 111 the masking pattern back onto the sector in order to obscure the operations which have been performed. The pattern which was written in 107 is now compared 113 with the pattern which was read back in 109. If indicia are present then the comparison done in 113 will reveal differences which are a consequence of both the indicia and the properties of the particular disk hardware in the computer system. If the indicia are large and the disk hardware cannot maintain synchronization then the pattern read from the complete section of the sector which follows the indicia may be incorrect in spite of the absence of further indicia. The operation performed by the driver in step 115 is intended to derive information about the positions of the indicia from the comparison of the written 107 and read 109 patterns. This information may be as little as the approximate byte location at which the comparison operation began to show differences. The test program now 117 takes that information and compares it with the information the test program contains concerning the locations of the indicia. If the information derived in 115 is in agreement with the information the test program contains concerning the expected indicia locations, then a flag is set in memory or a CPU register to indicate to the calling program that the disk is valid. If an inconsistency is found, then the flag is set to indicate that the disk is invalid.

It should be noted that steps 105 and 111 are only intended to frustrate attempts to break the copy-protection method by obscuring its operation. Steps 107, 109, and 113 through 119 are essential though minimal.

In summary, a key-on-disk copy-protection method and apparatus has been described in which nonmagnetic or permanently magnetized indicia have been created on a magnetic medium and used as a hardware key which is utilized as an indication of an original medium. These indicia modify data on a disk in a predictable way, such that the data read from the medium in a given sector differs in a predictable way from the data written to the sector when the medium is an original.

INDUSTRIAL APPLICABILITY

It is an object of the invention to provide an improved software copy protection mechanism.

It is another object of the invention to provide an improved software copy protection mechanism by including a hardware key on the magnetic medium which contains the software to be protected.

It is yet another object of the invention to provide an improved software copy protection mechanism by including a hardware key comprised of nonmagnetic or permanently magnetized indicia to select areas of a magnetic medium which may contain the software to be protected.

It is a further object of the invention to provide an improved software copy protection mechanism by including nonmagnetic or permanently magnetized indicia on select areas of a magnetic medium which may contain the software to be protected, with the indicia containing information that is not modifiable by the medium write process, therefore, it can be determined if the indicia exist in a specified pattern in the select areas by writing the areas with a test pattern which generates a change in the pattern of magnetic domains in the medium. The test pattern does not affect the indicia, as they are not responsive to the magnetic field of the write head. The information written into the select areas is then read and is compared with an expected pattern. If there is a match, the medium is an original, since this is an indication that the written areas contained the proper indicia.

Having thus described our invention, what we claim is new, and desire to secure by Letters Patent is:

1. A method of determining by a computer if a particular magnetic medium comprised of sections which are divided into subsections is an original or a copy, with an original having indicia on at least one subsection of at least one section thereon that are not modifiable by the medium write process, and a copy not having said indicia, or having indicia in a different pattern than said indicia, including a product program which is to be executed only if the medium is an original, and a medium test program for performing said method to test if said particular medium is an original, said method comprising the steps of:

writing at least portions of said sections of said particular medium with a test pattern which generates a change in the pattern of magnetic domains in said medium at predetermined locations within said portions, said portions including at least said indicia-containing subsections, with a subsection in said portions responding to said test pattern only in the absence of indicia thereon, to form a stored pattern in said portions;

storing an expected pattern, which is indicative of the pattern which is expected to be read from said portions of an original medium including said indicia;

comparing said expected pattern with said stored pattern on at least a per subsection basis, to determine if predetermined subsections have the expected pattern of magnetic domains; and executing said product program only in response to the comparison determining that the corresponding subsections have the expected pattern of magnetic domains, which is indicative of the presence of said indicia, thereby indicating that said particular medium is an original.

2. The method claimed in claim 1, wherein said particular magnetic medium is a disk.

3. The method claimed in claim 2, wherein said disk is a floppy disk.

4. The method claimed in claim 2, wherein said disk is a hard disk.

5. The method claimed in claim 1, wherein said particular magnetic medium is a magnetic tape.

6. The method claimed in claim 1, including the steps of:

storing a binary coded masking pattern in said portions of said particular medium;

reading said masking pattern from said portions and storing said masking pattern prior to said test pattern being written therein; and rewriting said masking pattern into said portions, subsequent to the reading of said stored pattern therefrom, to hide the operation used to determine if said particular medium is an original.

7. The method claimed in claim 6, wherein said particular medium is a disk.

8. The method claimed in claim 7, wherein said disk is a floppy disk.

9. The method claimed in claim 7, wherein said disk is a hard disk.

10. The method claimed in claim 6, wherein said particular medium is a magnetic tape.

11. A method of determining by a computer if a particular magnetic disk having tracks formed thereon which are divided into sectors is an original or a copy, with an original having indicia on at least one sector of at least one track thereon that are not modifiable by the disk write process, and a copy not having said indicia, or having indicia in a different pattern than said indicia, including a product program which is to be executed only if the disk is an original, and a disk test program stored performing said method to test if said particular disk is an original, said method comprising the steps of:

writing at least portions of said tracks of said particular disk with a test pattern which generates a change in the pattern of magnetic domains in said disk at predetermined bit locations within said portions, said portions including at least said indicia-containing sectors, with a bit location in said sectors responding to said test pattern only in the absence of indicia thereon, to form a stored pattern in said portions;

storing an expected pattern, which is indicative of the pattern which is expected to be read from said portions of an original disk including said indicia;

comparing said expected pattern with said stored pattern on at least a per bit location basis, to determine if predetermined locations have the expected pattern of magnetic domains; and executing said product program only in response to the comparison determining that the predetermined locations have the expected pattern of magnetic domains, which is indicative of the presence of said indicia, thereby indicating that said particular disk is an original.

12. The method claimed in claim 11, wherein said disk is a floppy disk.

13. The method claimed in claim 11, wherein said disk is a hard disk.

14. The method claimed in claim 11, including the steps of:

storing a binary coded masking pattern in said portions of said disk;

reading said masking pattern from said portions and storing said masking pattern prior to said test pattern being written therein; and rewriting said masking pattern into said portions, subsequent to the reading of said stored pattern therefrom, to hide the operations used to test if said disk is an original.

15. The method claimed in claim 14, wherein said disk is a floppy disk.

16. The method claimed in claim 14, wherein said disk is a hard disk.

17. A method of determining by a computer if a particular magnetic tape having records formed thereon which are divided into tracks is an original or a copy, with an original having indicia on at least one track of at least one record that are not modifiable by the tape write process, and a copy not having said indicia, or having indicia in a different pattern than said indicia, including a product program, which is to be executed only if the tape is an original, and a tape test program for performing said method to test if said particular tape is an original, said method comprising the steps of:

writing at least portions of said records of said particular tape with a test pattern which generates a change in the pattern of magnetic domains in said tape at predetermined bit locations within said portions, said portions including at least said indicia-containing tracks, with a bit location in said portions responding to said test pattern only in the absence of indicia thereon, to form a stored pattern in said portions;

storing an expected pattern, which is indicative of the pattern which is expected to be read from said portions of an original tape including said indicia;

comparing said expected pattern with said stored pattern on at least a per bit location basis, to determine if predetermined locations have the expected pattern of magnetic domains; and executing said product program only in response to the comparison determining that the predetermined locations have the expected pattern of magnetic domains, which is indicative of the presence of said indicia, thereby indicating that said particular tape is an original.

18. The method claimed in claim 17, including the steps of:

storing a binary coded masking pattern in said portions of said magnetic tape;

reading said masking pattern from said portions and storing said masking pattern prior to said test pattern being written therein; and rewriting said masking pattern into said portions, subsequent to the reading of said stored pattern therefrom, to hide the operation used to test if said particular tape is an original.

19. A method of determining by a computer if a particular magnetic disk having tracks formed thereon which are divided into sectors, with each sector being comprised of a plurality of bit storage locations, is an original or a copy, with an original disk having indicia on at least one bit storage location of at least one sector of at least one track that are not modifiable by the disk write process, with a copied disk not having said indicia, or having indicia in a different pattern than said indicia, including a product program, which is to be executed only if said disk is an original, and a disk test program for performing said method to test if said particular disk is an original, said method comprising the steps of:

storing a key pattern, which is a binary representation of the presence or absence of said indicia at predetermined locations of said at least one track of an original disk;

writing at least portions of said tracks of said particular disk with a test pattern which generates a change in the pattern of magnetic domains in said disk at predetermined bit locations within said portions, said portions including at least said indicia-containing bit storage locations, with a bit location in said portions responding to said test pattern only in the absence of indicia thereon, and reading out said portions to form a stored pattern, which is indicative of the presence or absence of said indicia at least at each bit storage location of said portions;

comparing said test pattern with said stored pattern on at least a per bit location basis to determine if predetermined locations have a pattern of indicia, to provide a first compare result;

comparing said key pattern with said first compare result on at least a per location basis to provide a second compare result which is indicative of whether or not said indicia on said sectors of said particular disk correspond with said indicia on said sectors of an original medium; and executing said product program only in response to the second compare result indicating a predetermined location comparison of said key pattern and said first compare result, thereby indicating that said particular disk is an original.

20. The method claimed in 19, wherein said disk is a floppy disk.

21. The method claimed in 19, wherein said disk is a hard disk.

22. The method claimed in claim 19, including the steps of:
storing a binary coded masking pattern in said portions of said particular disk;
reading said masking pattern from said portions and storing said masking pattern prior to said test pattern being written therein; and
rewriting said masking pattern into said portions, subsequent to the reading of said stored pattern therefrom, to hide the operation used to test if said particular disk is an original.

23. The method claimed in claim 22, wherein said disk is a floppy disk.

24. The method claimed in claim 22, wherein said disk is a hard disk.

25. A software copy-protection apparatus, which is operable with a computer, comprising:
a particular magnetic medium having tracks formed thereon which are divided into sectors, with each sector being comprised of a plurality of bit storage locations, with an original medium having indicia on at least one bit storage location of at least one sector of at least one track that are not modifiable by the medium write process, with a copied medium not having said indicia, or having indicia in a different pattern than said indicia;
a product program which is to be executed only if said medium is an original;
means for writing at least portions of said tracks with a test pattern which generates a change in the pattern of magnetic domains in said medium at predetermined bit locations within said portions, said portions including at least said indicia-containing bit locations, with a given bit location in said portions responding to said pattern only in the absence of indicia thereon;
means for storing an expected pattern which is indicative of the pattern which is expected to be read from said portions of an original medium including indicia, in a first storage location;
means for reading out said portions and storing the read out data in a second storage location;

means for comparing the expected pattern stored in said first storage location with the data stored in said second storage location on at least a per bit corresponding storage location basis to determine if predetermined locations have the expected pattern of magnetic domains; and means responsive to the comparison for executing said product program only in response to the comparison determining that predetermined locations on the medium have the expected pattern of magnetic domains, which is indicative of the presence of said indicia, thereby indicating that said particular medium is an original.

26. The combination claimed in claim 25, wherein said magnetic medium is a disk.

27. The combination claimed in claim 26, wherein said disk is a floppy disk.

28. The combination claimed in claim 26, wherein said disk is a hard disk.

29. The combination claimed in claim 26, including:
a binary coded masking pattern which is stored in said portions of said medium;
means for reading said masking pattern from said portions and storing it in a third storage location prior to said test pattern being written therein; and
means for rewriting said masking pattern into said portions, subsequent to the reading of said stored pattern therefrom, to hide the operation used to test if said particular medium is an original.

30. The combination claimed in claim 29, wherein said particular medium is a disk.

31. The combination claimed in claim 30, wherein said disk is a floppy disk.

32. The combination claimed in claim 30, wherein said disk is a hard disk.

33. A software copy-protection apparatus, which is operable with a computer, comprising:
a particular magnetic medium having records formed thereon which are divided into tracks, with each track being comprised of a plurality of bit storage locations, with an original medium having indicia on at least one bit storage location of at least one track of at least one record that are not modifiable by the medium write process, with a copied medium not having said indicia, or having indicia in a different pattern than said indicia;
a product program stored on said medium which is to be executed only if said medium is an original;
means for writing at least portions of said records with a test pattern which generates a change in the pattern of magnetic domains in said medium at predetermined bit locations in said portions, said portions including at least said indicia-containing bit locations, with a given bit location in said portions responding to said test pattern only in the absence of indicia thereon;
means for storing an expected pattern, which is indicative of the pattern which is expected to be read from said portions of an original medium including said indicia, in a first storage location;
means for reading out said portions and storing the read out data in a second storage location;
means for comparing the expected pattern stored in said first storage location with the data stored in said second storage location on a least a per bit corresponding basis to determine if predetermined locations have the expected pattern of magnetic domains; and means responsive to the comparison for executing said product program only in response to the comparison determining that predetermined locations exhibit the expected pattern of magnetic domains, which is indicative of the presence of said indicia, thereby indicating that said particular medium is an original.

34. The combination claimed in claim 33, wherein said particular medium is a magnetic tape.

35. The combination claimed in claim 33, including:
a masking pattern which is stored in said portions of said particular medium;
means for reading said masking pattern from said portions and storing it in a third storage location prior to said test pattern being written therein; and
means for rewriting said masking pattern into said portions, subsequent to the reading of said stored pattern therefrom, to hide the operation used to test if said particular medium is an original.

36. The combination claimed in claim 35, wherein said particular medium is a magnetic tape.

37. A software copy-protection apparatus, which is operable with a computer, comprising:
a particular magnetic medium having tracks formed thereon which are divided into sectors, with each sector being comprised of a plurality of bit storage locations, with an original medium having indicia on at least one bit storage location of at least one sector of at least one track that are not modifiable by the medium write process, with a copied medium not having said indicia, or having indicia in a different pattern than said indicia;
a product program which is to be executed only if said medium is an original;
means for storing a key pattern in a first storage location, which is a binary representation indicative of the presence or absence of said indicia at predetermined locations of said at least one track of an original medium;
means for writing at least portions of said tracks of said medium with a test pattern which generates a change in the pattern of magnetic domains in said medium at predetermined bit locations within said portions, said portions including at least said indicia-containing bit storage location, with a bit location in said portions responding to said test pattern only in the absence of indicia thereon;
means for storing said test pattern in a second storage location;
means for reading out said portions and storing the read out data in a third storage location;
means for comparing the test pattern stored in said second storage location with the data stored in said third storage location on at least a per bit corresponding storage location basis to provide a first compare result;
means for comparing said key pattern, stored in said first storage location, with said first compare result on at least a per location basis to provide a second compare result which is indicative of whether or not said indicia on said sectors of said particular medium correspond with said indicia on said sectors of an original medium; and
means responsive to the second compare result for executing said product program only in response to the comparison determining that predetermined locations on the medium and the key pattern indicate a predetermined location comparison, thereby indicating that said particular medium is an original.

38. The combination claimed in claim 37, wherein said particular medium is a disk.

39. The combination claimed in claim 38, wherein said disk is a floppy disk.

40. The combination claimed in claim 38, wherein said disk is a hard disk.

41. The combination claimed in claim 37, including:
a masking pattern which is stored in said portions of said particular medium;
means for reading said masking pattern from said portions and storing it in a fourth storage location prior to said test pattern being written therein; and
means for rewriting said masking pattern into said portions, subsequent to the reading of said stored pattern therefrom, to hide the operation used to test if said particular medium is an original.

42. The combination claimed in claim 41, wherein said particular magnetic medium is a disk.

43. The combination claimed in claim 42, wherein said disk is a floppy disk.

44. The combination claimed in claim 42, wherein said disk is a hard disk.

45. A software copy-protection apparatus, which is operable with a computer, comprising:
a particular magnetic medium having records formed thereon which are divided into tracks, with each track being comprised of a plurality of bit storage locations, with an original medium having indicia on at least one bit storage location of at least one track of at least one record that are not modifiable by the medium write process, with a copied medium not having said indicia, or having indicia in a different pattern than said indicia;
a product program which is to be executed only if said medium is an original;
means for storing a key pattern in a first storage location, which is a binary representation indicative of the presence or absence of said indicia at predetermined locations of said at least one track of an original medium;
means for writing at least portions of said records of said medium with a test pattern which generates a change in the pattern of magnetic domains in said medium at predetermined bit locations within said portions, said portions including at least said indicia-containing bit storage locations, with a bit location in said portions responding to said test pattern only in the absence of indicia thereon;
means for storing said test pattern in a second storage location;
means for reading out said portions and storing the read out data in a third storage location;
means for comparing the test pattern stored in said second storage location with the data stored in said third storage location on at least a per bit corresponding storage location basis to provide a first compare result;
means for comparing said key pattern, stored in said first storage location, with said first compare result on at least a per location basis to provide a second compare result which is indicative of whether or not said indicia on said tracks of said particular medium correspond with said indicia on said tracks of an original medium; and
means responsive to the second compare result for executing said product program only in response to the comparison determining that predetermined locations on the medium and the key pattern indicate a predetermined location comparison, thereby indicating that said particular medium is an original.

46. The combination claimed in claim 45, wherein said particular medium is a magnetic tape.

47. The combination claimed in claim 45, including:
a masking pattern which is stored in said portions of said particular medium;
means for reading said masking pattern from said portions and storing it in a fourth storage location prior to said test pattern being written therein; and
means for rewriting said masking pattern into said portions, subsequent to the reading of said stored pattern therefrom, to hide the operation used to test if said particular medium is an original.

48. The combination claimed in claim 47, wherein said particular medium is a magnetic tape.

49. A method of forming a hardware key on a magnetic medium to indicate that said magnetic medium is an original and not a copy, said method comprising the step of:
introducing indicia into predetermined areas of said magnetic medium to create said key, with data read from said areas differing from data written to said areas, due to the presence of said indicia, as said indicia do not respond to a magnetic field by changing the pattern of magnetic domains therein.

50. The combination claimed in claim 49, wherein said indicia are comprised of one or more regions containing no magnetic material, such regions being therefore unaffected by the medium write process.

51. The combination claimed in claim 49, wherein said indicia are comprised of one or more permanently magnetized regions, such regions having the property that the material therein has a coercivity higher than the magnetic field used in the medium write process, such regions being therefore unaffected by the medium write process.

52. The combination claimed in claim 49, wherein said magnetic medium is a disk, having tracks formed thereon which are divided into sectors, with each sector being comprised of a plurality of bit storage locations, with said predetermined areas comprising at least one bit location of at least one sector of at least one track.

53. The combination claimed in claim 52, wherein the said disk is a floppy disk.

54. The combination claimed in claim 52, wherein the said disk is a hard disk.

55. The combination claimed in claim 49, wherein said magnetic medium is a magnetic tape, having records formed thereon which are divided into tracks, with each track being comprised of a plurality of bit storage locations, with said predetermined areas comprising at least one bit location of at least one track of at least one record.

56. The combination claimed in claim 50, wherein said magnetic medium is a disk, having tracks formed thereon which are divided into sectors, with each sector being comprised of a plurality of bit storage locations, with said predetermined areas comprising at least one bit location of at least one sector of at least one track.

57. The combination claimed in claim 56, wherein the said disk is a floppy disk.

58. The combination claimed in claim 56, wherein the said disk is a hard disk.

59. The combination claimed in claim 50, wherein said magnetic medium is a magnetic tape, having records formed thereon which are divided into tracks, with each track being comprised of a plurality of bit storage locations, with said predetermined areas comprising at least one bit location of at least one track of at least one record.

60. The combination claimed in claim 51, wherein said magnetic medium is a disk, having tracks formed thereon which are divided into sectors, with each sector being comprised of a plurality of bit storage locations, with said predetermined areas comprising at least one bit location of at least one sector of at least one track.

61. The combination claimed in claim 60, wherein said disk is a floppy disk.

62. The combination claimed in claim 60, wherein said disk is a hard disk.

63. The combination claimed in claim 51, wherein said magnetic medium is a magnetic tape, having records formed thereon which are divided into tracks, with each track being comprised of a plurality of bit storage locations, with said predetermined areas comprising at least one bit location of at least one track of at least one record.

* * * * *